(12) United States Patent
Frolik et al.

(10) Patent No.: US 11,210,747 B2
(45) Date of Patent: Dec. 28, 2021

(54) SYSTEMS AND METHODS FOR RANDOMIZED, PACKET-BASED POWER MANAGEMENT OF CONDITIONALLY-CONTROLLED LOADS AND BI-DIRECTIONAL DISTRIBUTED ENERGY STORAGE SYSTEMS

(71) Applicant: University of Vermont and State Agricultural College, Burlington, VT (US)

(72) Inventors: Jeff Frolik, Burlington, VT (US); Paul Hines, Burlington, VT (US); Mads Almassalkhi, Burlington, VT (US)

(73) Assignee: University of Vermont and State Agricultural College, Burlington, VT (US)

(*) Notice: Subject to any disclaimer, the term of this patent is extended or adjusted under 35 U.S.C. 154(b) by 1082 days.

(21) Appl. No.: 15/712,089

(22) Filed: Sep. 21, 2017

(65) Prior Publication Data
US 2018/0082385 A1    Mar. 22, 2018

Related U.S. Application Data

(60) Provisional application No. 62/397,393, filed on Sep. 21, 2016.

(51) Int. Cl.
*G06Q 50/06* (2012.01)
*H02J 3/14* (2006.01)
(Continued)

(52) U.S. Cl.
CPC ............ *G06Q 50/06* (2013.01); *G06F 17/18* (2013.01); *H02J 3/00* (2013.01); *H02J 3/14* (2013.01);
(Continued)

(58) Field of Classification Search
CPC .. H02J 13/00; H02J 13/00034; H02J 13/0006; H02J 2310/12; H02J 2310/64;
(Continued)

(56) References Cited

U.S. PATENT DOCUMENTS 5,577,028 A    11/1996   Chugo et al.
7,373,222 B1    5/2008   Wright et al.
(Continued)

FOREIGN PATENT DOCUMENTS

EP       2978122 A1    1/2016
JP    2010512727 A     4/2010
(Continued)

OTHER PUBLICATIONS

U.S. Department of Energy, Enabling Modernization of the Electric Power System, Sep. 2015, Quadrennial Technology Review, pp. 51-99. (Year: 2015).*

(Continued)

*Primary Examiner* — Kidest Bahta
(74) *Attorney, Agent, or Firm* — Downs Rachlin Martin PLLC

(57) ABSTRACT

The present disclosure provides a distributed and anonymous approach to demand response of an electricity system. The approach conceptualizes energy consumption and production of distributed-energy resources (DERs) via discrete energy packets that are coordinated by a cyber computing entity that grants or denies energy packet requests from the DERs. The approach leverages a condition of a DER, which is particularly useful for (1) thermostatically-controlled loads, (2) non-thermostatic conditionally-controlled loads, and (3) bi-directional distributed energy storage systems. In a first aspect of the present approach, each DER independently requests the authority to switch on for a fixed amount of time (i.e., packet duration). The coordinator determines (Continued)

whether to grant or deny each request based electric grid and/or energy or power market conditions. In a second aspect, bi-directional DERs, such as distributed-energy storage systems (DESSs) are further able to request to supply energy to the grid.

39 Claims, 12 Drawing Sheets

(51) Int. Cl.
  *H02J 13/00* (2006.01)
  *G06F 17/18* (2006.01)
  *H02J 3/00* (2006.01)
(52) U.S. Cl.
  CPC .............. *H02J 13/00* (2013.01); *H02J 3/003* (2020.01); *Y02B 70/3225* (2013.01); *Y04S 20/222* (2013.01)
(58) Field of Classification Search
  CPC .... H02J 3/00; H02J 3/003; H02J 3/005; H02J 3/14; Y02B 70/3225; Y02B 70/30; Y02B 90/20; Y04S 20/222; Y04S 20/00; Y04S 20/221; Y04S 50/10; G05B 19/042; G05B 2219/2639; G06F 17/18; G06Q 50/06; H03H 17/02
  See application file for complete search history.

(56) References Cited

U.S. PATENT DOCUMENTS

| | | | |
|---|---|---|---|
| 8,065,099 B2 | 11/2011 | Gibala et al. | |
| 10,169,833 B2 | 1/2019 | Barooha et al. | |
| 10,256,631 B2 | 4/2019 | Frolik et al. | |
| 2003/0160595 A1* | 8/2003 | Provanzana | H02J 5/00 320/166 |
| 2008/0034111 A1 | 2/2008 | Kamath et al. | |
| 2009/0157835 A1 | 6/2009 | Thompson | |
| 2009/0193268 A1 | 7/2009 | Kreiner et al. | |
| 2009/0204268 A1* | 8/2009 | Eaves | H02H 3/30 700/293 |
| 2010/0079009 A1 | 4/2010 | Hyde et al. | |
| 2011/0047552 A1 | 2/2011 | Mergen et al. | |
| 2011/0062787 A1 | 3/2011 | Pan | |
| 2011/0233997 A1 | 9/2011 | Tajima | |
| 2012/0008626 A1* | 1/2012 | Brederveld | G06Q 10/087 370/392 |
| 2012/0020237 A1 | 1/2012 | Tanaka et al. | |
| 2012/0074909 A1 | 3/2012 | Hondo et al. | |
| 2012/0169291 A1 | 7/2012 | Abe et al. | |
| 2012/0179596 A1 | 7/2012 | Mitsumoto et al. | |
| 2012/0235646 A1 | 9/2012 | Lo et al. | |
| 2013/0006677 A1 | 1/2013 | Anglin et al. | |
| 2013/0044657 A1 | 2/2013 | Oh et al. | |
| 2013/0166081 A1 | 6/2013 | Sanders | |
| 2013/0182558 A1* | 7/2013 | Orten | H04W 84/18 370/216 |
| 2013/0211609 A1 | 8/2013 | Edtmair et al. | |
| 2013/0234535 A1 | 9/2013 | Sako et al. | |
| 2014/0074307 A1 | 3/2014 | Matsuyama et al. | |
| 2014/0114829 A1 | 4/2014 | Forbes, Jr. | |
| 2014/0117946 A1 | 5/2014 | Muller et al. | |
| 2014/0148962 A1 | 5/2014 | Venayagamoorthy | |
| 2015/0012146 A1 | 1/2015 | Cherian et al. | |
| 2015/0077056 A1 | 3/2015 | Bridges et al. | |
| 2015/0142198 A1* | 5/2015 | Grebel | H02J 3/008 700/295 |
| 2015/0357817 A1 | 12/2015 | Briel | |
| 2015/0380936 A1* | 12/2015 | Frolik | H04L 12/6418 307/112 |
| 2016/0261116 A1 | 9/2016 | Barooah et al. | |
| 2018/0189899 A1 | 7/2018 | Meyn et al. | |
| 2019/0214820 A1 | 7/2019 | Frolik et al. | |

FOREIGN PATENT DOCUMENTS

| | | |
|---|---|---|
| WO | 2014137845 A1 | 9/2014 |
| WO | 2016077813 A1 | 5/2016 |
| WO | 2017004487 A1 | 1/2017 |

OTHER PUBLICATIONS

Zhang et al., "A Packetized Direct Load Control Mechanism For Demand Side Management." 51st IEEE Conference on Decision and Control, Dec. 10-13, 2012.
Zhang et al., "A Novel Packet Switching Framework with Binary Information In Demand Side Management." 52nd IEEE Conference on Decision and Control, Dec. 10-13, 2013.
PCT International Search Report and Written Opinion dated Nov. 27, 2017, in related International Application No. PCT/US2017/052828.
Frolik, J., et al., "Urgency-Driven, Plug-In Electric Vehicle Charging," IEEE: Innovative Smart Grid Technologies (ISGT Europe), 2012 3rd IEEE PES International Conference and Exhibition, Oct. 14-17, 2012.
Hilshey, A.D., et al., "Electric Vehicle Charging: Transformer Impacts and Smart, Decentralized Solutions," IEEE: Power and Energy Society General Meeting, 2012 IEEE, Jul. 22-26, 2012.
Vandael, S., et al., "Decentralized Coordination of Plug-In Hybrid Vehicles For Imbalance Reduction In A Smart Grid," Proceeding AAMAS 11 the 10the International Conference on Autonomous Agents and Multiagent Systems, vol. 2, pp. 803-810, Jan. 1, 2011.
Mathieu, Johanna L., "State Estimation and Control of Electric Loads to Manage Real-Time Energy Imbalance." IEEE Transactions on Power Systems, vol. 28, No. 1, Feb. 2013.
Meyn, et al., "Ancillary Service to the Grid Using Intelligent Deferrable Loads." IEEE Transactions on Automatic Control, vol. 60., No. 11, Nov. 2015.

\* cited by examiner

SYSTEMS AND METHODS FOR RANDOMIZED, PACKET-BASED POWER MANAGEMENT OF CONDITIONALLY-CONTROLLED LOADS AND BI-DIRECTIONAL DISTRIBUTED ENERGY STORAGE SYSTEMS

CROSS-REFERENCE TO RELATED APPLICATIONS

This application claims priority to U.S. Provisional Application No. 62/397,393, filed on Sep. 21, 2016, the disclosure of which is incorporated herein by reference.

STATEMENT REGARDING FEDERALLY SPONSORED RESEARCH

This invention was made with government support under contract no. ECCS-1254549 awarded by the National Science Foundation and DE-AR0001289-1509 awarded by the Department of Energy. The government has certain rights in the invention.

FIELD OF THE DISCLOSURE

The present disclosure relates to the management of distributed energy resources.

BACKGROUND OF THE DISCLOSURE

Fast-ramping generators have long provided reliable operating reserves for power systems. However, power systems with high penetrations of renewable energy challenge this operating paradigm. At high levels of renewable penetration, current approaches to deal with the variability in wind or solar generation would require having more fast-ramping conventional generators online. However, that leads to more generators idling, burning fuel, and increasing harmful air-emissions, which all oppose the goals of a "green" energy future. Therefore, there is a need to move away from using such technologies to provide operating reserves, and to consider an active role for flexible and controllable net-load energy resources, e.g., plug-in electric vehicles (PEVs), thermostatically-controlled loads (TCLs), distributed energy storage systems (DESSs), and distributed generation at the consumer level.

To date, demand-side participation has largely been limited to loads responding to infrequent requests to reduce demand during peak hours, open-loop binary control, or indirect financial incentives, such as critical peak pricing. But, these methods do not unleash the distributed energy assets' full flexibility, ignore local consumer constraints, and/or require non-trivial effort from consumers to implement. Therefore, recent work has focused on developing feedback algorithms for autonomous coordination of flexible distributed energy resources (DERs) through pricing and control signals, effectively taking the human consumer out of the loop and enabling a truly responsive and grid.

Coordination strategies for highly distributed net-load resources generally take one of two forms: (1) utility-centric or (2) consumer-centric. In the former, utilities minimize the use of available grid capacity to meet system objectives, such as "valley-filling," using, for example, mean-field strategies that are designed to delay consumer access to the grid, which can be unacceptable in terms of customer quality of service (QoS). Consumer-centric approaches generally rely on non-centralized optimal control algorithms that are derived via iterative methods (e.g., dual ascent, method of multipliers) or consensus algorithms, both of which exhibit slow convergence (i.e., dozens of iterations are required per time-step) for large sets of flexible net-loads. The rate of convergence may cause infeasibility in the primal problem, which affects QoS (e.g., a PEV is not charged to the desired level or TCL exceeds the specified local dead-band limits).

BRIEF SUMMARY OF THE DISCLOSURE

The present disclosure provides a distributed and anonymous approach to demand response, known as packetized energy management (PEM), for distributed-energy resources, and especially (1) thermostatically-controlled loads (e.g., water heaters, air conditioners, etc.); (2) non-thermostatic conditionally-controlled loads (e.g., batteries, compressors, etc.); and (3) bi-directional distributed energy storage systems (e.g., batteries, etc.) In a first aspect of the presently-disclosed PEM approach, each DER independently requests the authority to switch on for a fixed amount of time (i.e., the duration of a control epoch). Load is managed (as opposed to strictly controlled) in the sense that if total aggregate load needs to decrease, then these load-requests are denied. In a second aspect, bi-directional DERs, such as DESSs are further able to request to provide energy back to the grid for a fixed amount of time.

The present disclosure introduces a novel distributed bottom-up control approach rather than the top-down approaches proposed in the literature. To overcome privacy, convergence, and QoS concerns, and to enable large-scale penetration of renewable energy, the disclosed PEM load-coordination framework regulates the aggregate power consumption of DERs. Specifically, the delivery of energy to or from a DER is accomplished using multiple "energy packets" or "packetized energy." The device-based (or bottom-up) randomization aspect of the method provides certain "fairness" properties with regard to providing statistically-identical grid access to each load.

In contrast to previous and other existing techniques, PEM reduces the information necessary between coordination and load layers: the coordinator requires only anonymous and asynchronous stochastically-generated access requests from loads and a real-time measure of the aggregate output deviation from desired reference. The asynchronous nature of PEM enables separately-defined time intervals for communication and control. Furthermore, through the use of a probabilistic automata with opt-out control capability at the local control layer, randomization is injected to the load requests based on local state variables, which prevents synchronization, guarantees consumer QoS, and promotes fair access to the grid.

DESCRIPTION OF THE DRAWINGS

For a fuller understanding of the nature and objects of the disclosure, reference should be made to the following detailed description taken in conjunction with the accompanying drawings, in which:

FIG. 6 bottom shows mean time to request curves for "charge" and "discharge" automatons as a function of a DESS's dynamic state (e.g., state of charge in a battery storage system).

DETAILED DESCRIPTION OF THE DISCLOSURE

In a first aspect of the present disclosure, an anonymous, asynchronous, and randomized bottom-up control scheme for distributed energy resources (DERs) is presented, including: (1) a novel packetized energy management (PEM) control scheme for managing DERs that provides near-optimal tracking performance under imperfect information and consumer QoS constraints; (2) an illustration of the performance of the presently-disclosed PEM paradigm using a simulation-based analysis. The analysis demonstrates a new framework for highly-distributed bottom-up load coordination in power systems.

Figure 1:
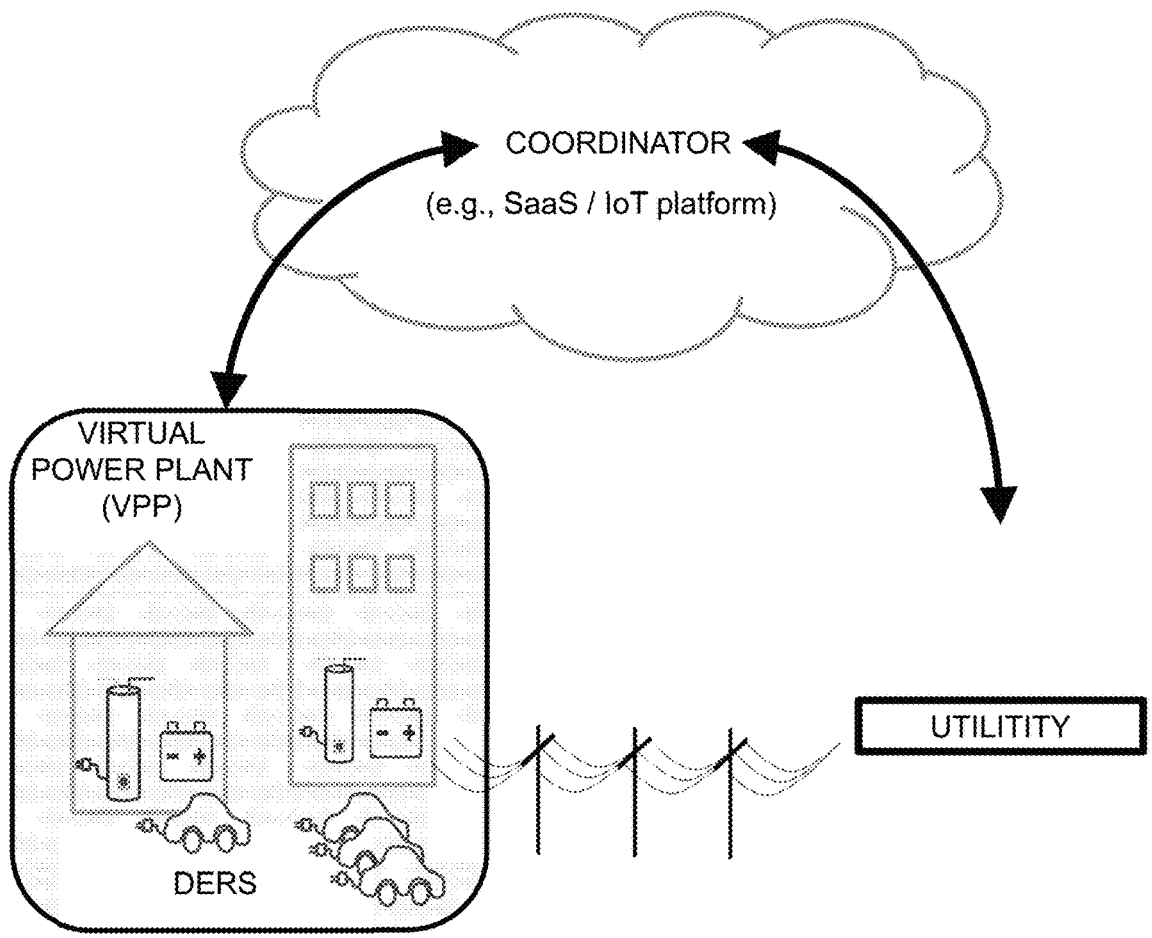
FIG. 1 shows a DER coordination scheme. A plurality of distributed energy resources (DERs) are aggregated to form a virtual power plant (VPP). The DERs are physically connected to the utilities through power lines, which provide their source of power. The DERs are managed using a virtual connection through a coordinator. The coordinator uses information from the utilities or other sources (e.g., available/forecasted supply, pricing signals, etc.) to determine whether DERs may operate.

The system in FIG. 1 illustrates the cyber-physical interactions in an embodiment of a power system that may be used to realize PEM. The functions of the grid operator (e.g., a utility), the coordinator (e.g., DER management platform or a virtual power plant), and the packetized load (e.g., via WiFi-enabled gateway) will be separately described. Owing to the disclosed bottom-up approach, the concept of a packetized load is described first.

A. Packetized Load

PEM has previously been proposed for coordinated charging of plug-in electric vehicles (PEVs) (see Pub. No. US 2015/038936 A1, incorporated herein by this reference). In this earlier work, PEVs asynchronously request the authority to charge with a specific probability according to their state in a probabilistic automaton. For example, for a three-state finite-state machine, the probability to request access to the grid from state i is $P_i$ and $P_1 > P_2 > P_3$. If there is capacity in the grid, the PEV is granted authority to charge, but only for a fixed duration of time (e.g., 15 minutes), referred to as the control epoch and a state transition takes place: $P_i \to P_{i-1}$, which reduces the mean time-to-request. In contrast, if the PEV is denied authority to charge, the mean time-to-request increases with transition $P_i \to P_{i+1}$.

The present disclosure provides PEM techniques used with loads whose operations, including request probabilities, change based on locally-sensed conditions. For example, in some embodiments of the present disclosure below, a thermostatically controlled load (TCL) can be managed by using the TCL's local temperature to drive the randomization of its requests. In other examples, pressure may be used for compressor operations, voltage and state of charge may be used for battery storage systems, etc. It should be noted that exemplary embodiments directed to TCLs are provided for illustrating the disclosure, and absent an express limitation, the scope of the disclosure is not to be limited to TCLs.

In some embodiments, the present disclosure may be embodied as a node 10 for requesting electrical power from a coordinator 90 during a communication epoch. The node 10 comprises a coordinator interface 12 for communication with the coordinator 90. The coordinator interface 12 may be configured for wireless communication, wired communication, or combinations of wireless and wired. In some embodiments, for example, the coordinator interface is configured for power line communication with the coordinator—i.e., using a communication protocol that is transmitted/received over the power line. The communication epoch is the length of time between requests made by the node. In some embodiments, the communication epoch is fixed and predetermined. In other embodiments, the communication epoch may change. For example, in some embodiments, a communication epoch is sent from the coordinator to one or more nodes. In such embodiments, the node 10 may be configured to receive a communication epoch parameter from the coordinator to determine the length of time between requests made by the node.

In some embodiments, the node 10 is a physical device co-located with a corresponding DER. For example, the node may be a device near a hot water heater (or incorporated into the hot water heater—e.g., making up a portion of the hot water heater). In other embodiments, the node is implemented in software (a "software agent"). For example, the node may be implemented in the cloud and remotely managing the DER.

The node 10 has a state register 14 for recording a state of the node (i). For example, the node may be in a first state, which has a first request probability ($P_1$), or a second state, which has a second state request probability ($P_2$). The node may have more states, for example, a third state with a third request probability ($P_3$) (or more than three states). The node 10 also has node condition (T). The node condition may be, for example, a temperature, a pressure, a revolution rate, a state of charge, a time-based deadline, or any other condition. A node may have more than one condition, for example, a temperature and a state of charge. The node may include one or more sensors 16 to measure corresponding node conditions. For example, the node may include a temperature sensor to measure the temperature—e.g., a hot water heater node may include a sensor to measure a temperature of the hot water stored within a tank.

The node 10 is configured to retrieve a node state from the node register 14. For example, in some embodiments, the node may include a processor and the node register may be implemented in computer memory. In such embodiments, the processor may be programmed to retrieve a node state from the node register. As further discussed below, a request probability $P_i(T)$ is determined for the epoch. The request probability may be, for example, a probability that a request will be sent during the communication epoch. In a more specific example, the request probability is a charge request probability that a request for an energy packet (a charge request) will be sent to the coordinator. The request probability corresponds to the retrieved node state and the node condition (further described below).

In some embodiments, the request probability approaches 1 as the condition, T, reaches a lower threshold, $T_{low}$, and the request probability approaches 0 when T approaches an upper threshold, $T_{high}$. The node may be configured to opt-out of requesting energy packets when T reaches $T_{low}$. In other embodiments, the request probability approaches 1 as T reaches $T_{high}$, and the request probability approaches 0 as T approaches $T_{low}$. The node may be configured to opt-out of requesting energy packets when T reaches $T_{high}$.

The node 10 may be further configured to receive a response to the request. For example, in some embodiments, the node receives approval from the coordinator of the request for an energy packet. The node may then change the node states recorded in the state register based upon the response. For example, on an approved request, the node state may change from the first state to the second state. In another example, the node state may change from the second state to the first state. Other cases exist for nodes with more than two states and will be apparent in light of the present disclosure. The node 10 may be further configured to access electrical power based on the received response. For example, on approval of the requested energy packet, the node may access electrical power for a packet duration (a pre-determined length of time).

In another embodiment, the present disclosure may be embodied as a method 100 for requesting electrical power during a communication epoch. The method 100 includes determining 103 a node state as a first state, with a first request probability, or a second state, with a second request probability. A charge request probability for the epoch is determined 106. The determined 106 charge request probability corresponds to the retrieved 103 node state and a node condition (both as described above and further described below). A charge request is sent 109 based on the determined 106 charge request probability.

In some embodiments, the method 100 may be performed on a node that is a DESS. As such, the method 100 may use a state of charge as the node condition. The method 100 may further comprise determining 112 a discharge node state as a first discharge state, with a first discharge probability, or a second discharge state, with a second discharge probability. A discharge request probability is determined 115 for the epoch, corresponding to the retrieved 112 discharge node state and the node condition. A discharge request is sent 118 based on the discharge request probability. In some embodiments, the charge request probability approaches 1 as the state of charge decreases to a charge threshold, $C_{thresh}$, and the discharge request probability approaches 1 as the state of charge increases to a discharge threshold, $D_{thresh}$, where $C_{thresh} < D_{thresh}$. In some embodiments, no charge request or discharge request is sent if the request probability and discharge request probability would otherwise cause both a charge request and a discharge request to be sent.

1) Traditional Control of TCLs

The vast majority of existing traditional TCLs operate in a binary (ON/OFF) manner and are already controlled by simple state machines—for example, thermostats that change state based on temperature thresholds. Locally, a $n^{th}$ TCL is controlled to maintain a desired condition (i.e., temperature) set-point, $T_n^{set}$, within a temperature deadband, $T_n^{set} \pm T_n^{set,DB}/2$. This yields the standard TCL hysteretic temperature response according to local discrete-time control logic:

$$z_n[k+1] = \begin{cases} 1, & T_n[k+1] \le T_n^{set} - T_n^{set,DB}/2 \\ 0, & T_n[k+1] \ge T_n^{set} + T_n^{set,DB}/2 \\ z_n[k], & \text{otherwise.} \end{cases} \quad (1)$$

The aggregate response under the above fully-decentralized control logic is referred to herein as the "no-control" case. The proposed PEM scheme requires only the replacement of the existing state machine with a more sophisticated one (i.e., the equivalent of a firmware upgrade) that interacts with a coordinator.

2) Adaptation of PEM for TCLs

Figure 2:
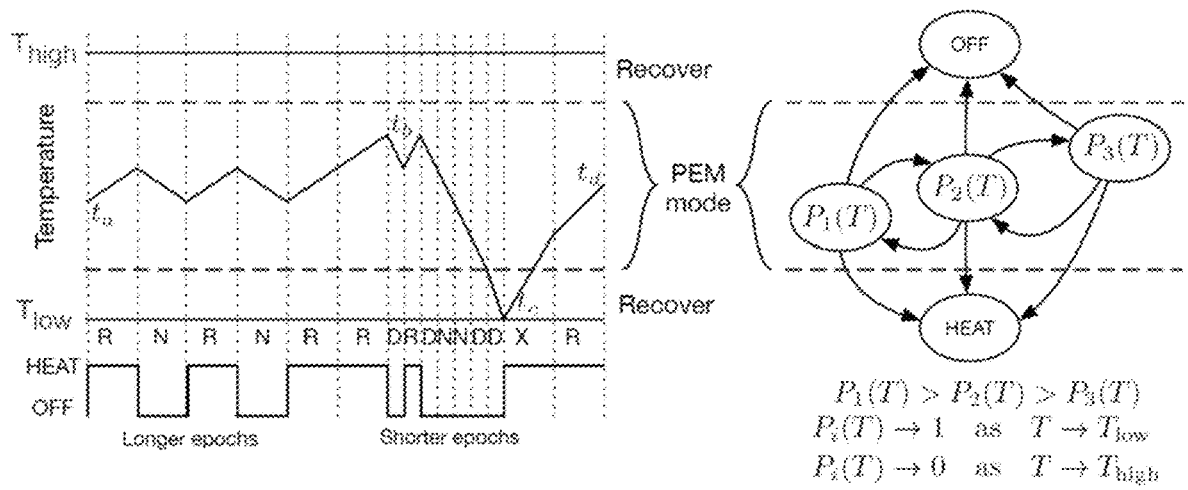
FIG. 2 shows a water heater managed by an exemplary embodiment of packetized-energy management (PEM). The left figure shows a sequence of events. At time $t_a$, when grid resources are unconstrained, loads stochastically request (R) or do not request (N) energy. At $t_b$, the system approaches a period of constrained supply, in which the system coordinator mostly denies requests (D) and reduces the epoch length. As a result, the automaton transitions to a lower probability state (e.g., $P_1 \to P_2$). At $t_c$, the temperature hits the QoS bound and the load exits (X) from PEM and rapidly seeks to recover temperature to within the QoS bounds, which occurs at $t_d$. The right figure shows the state machine that changes its request probabilities ($P_i(T)$) and its epoch lengths, based on responses the local temperature state. Also embedded in the automaton is the epoch lengths between state transitions/making requests.

FIG. 2 (right) illustrates a TCL automaton under PEM for the purpose of heating (e.g., an electric furnace or water heater). When the local temperature of the TCL, T, is between its upper and lower temperature limits for PEM operation, the TCL's time-to-request may be driven by, for example, an exponential distribution whose mean is inversely proportion to T relative to the upper limit. That is, TCLs with temperatures very close to the lower threshold will make requests with near certainty (i.e., $P_i(T \to T_{low}) \approx 1$) and those near the upper limit in temperature will make requests with low probability (i.e., $P_i(T \to T_{high}) \approx 0$). Upon transmitting a request and, if there is capacity in the grid, the TCL will be given the authority to turn ON for a fixed control epoch length $\delta_t$ (i.e., $z_n(t)=1$ for $t \in (t_0, t_0+\delta_t)$), and a state transition occurs: $P_i(T) \to P_{i-1}(T)$. If the request is denied, the TCL finite state machine transitions to a state with lower mean time-to-request, $P_i(T) \to P_{i+1}(T)$, but will immediately resume requesting with temperature-dependent probability. If access is denied repeatedly, T reaches $T_{low}$, which causes the TCL to exit (i.e., opt-out of) the PEM scheme to guarantee that temperature bounds are satisfied. An illustrative ON/OFF cycle of a packetized water heater is illustrated in FIG. 2 (left). Note that the illustrative cycle depicted in the figure would be reversed if the node was a cooling node (i.e., a node managing a cooling DER such as, for example, a freezer, etc.)

In addition to the TCL receiving an "allow/deny" response to a request, the TCL may also receive an updated (global) control epoch length, $\delta_t$, thus enabling tighter tracking in the aggregate, which is helpful during ramping events. While a TCL is ON, it does not make requests. Furthermore, $\delta_t \geq \Delta t$.

Since all TCLs operate in this manner, the DER coordinator granting or denying the authority to turn on does not require any knowledge/tracking of a particular TCL. Furthermore, the coordinator does not even track which TCL is making a particular request. As each TCL runs the same automaton logic and its ability to turn on depends only on the real-time system capacity, any TCL making a request at the same point in time will be treated the same by the coordinator. As such, the PEM approach inherently maintains privacy while still being fair to its customers. The PEM approach and resulting system is agnostic to the types or mix of TCLs being coordinated. That is, electric water heaters and air conditioners can be managed on the same system. The Quality of Service for the customers is guaranteed through the devices ability to temporarily "opt-out" of PEM when the device's condition falls out of the deadband.

3) The Stochastic Request Rate with PEM

In the discrete-time implementation of PEM, the probability that TCL n with local temperature $T_n[k]$ in automaton state i requests access to the grid during time-step k (over interval $\Delta t$) is defined by the cumulative exponential distribution function:

$$P_i(T_n[k]) := 1 - e^{-\mu(T_n[k], i)\Delta t} \quad (2)$$

where rate parameter $\mu(T_n[k], i) > 0$ is dependent on the local temperature and the probabilistic automaton's machine state i. This dependence is established by considering the following boundary conditions:

1. $P_i$ (TCL n requests access at k)|$T_n[k] \leq T_i^{min}$)=1
2. $P_i$ (TCL n requests access at k)|$T_n[k] \geq T_i^{max}$)=0, which give rise to the following natural design of a PEM rate parameter:

$$\mu(T_n[k], i) = \begin{cases} \infty, & \text{if } T_n[k] > T_n^{max} \\ \dfrac{T_n^{max} - T_n[k]}{T_n[k] - T_n^{min}} M_i, & \text{if } T_n[k] \in (T_n^{min}, T_n^{max}] \\ 0, & \text{if } T_n[k] \leq T_n^{min} \end{cases} \quad (3)$$

where $M_i > 0$ [1/sec] is a design parameter that depends on the TCL's automaton state i and describes the mean time-to-request. Note that (2) is illustrative and other functions (e.g., linear) could also be employed.

Figure 4:
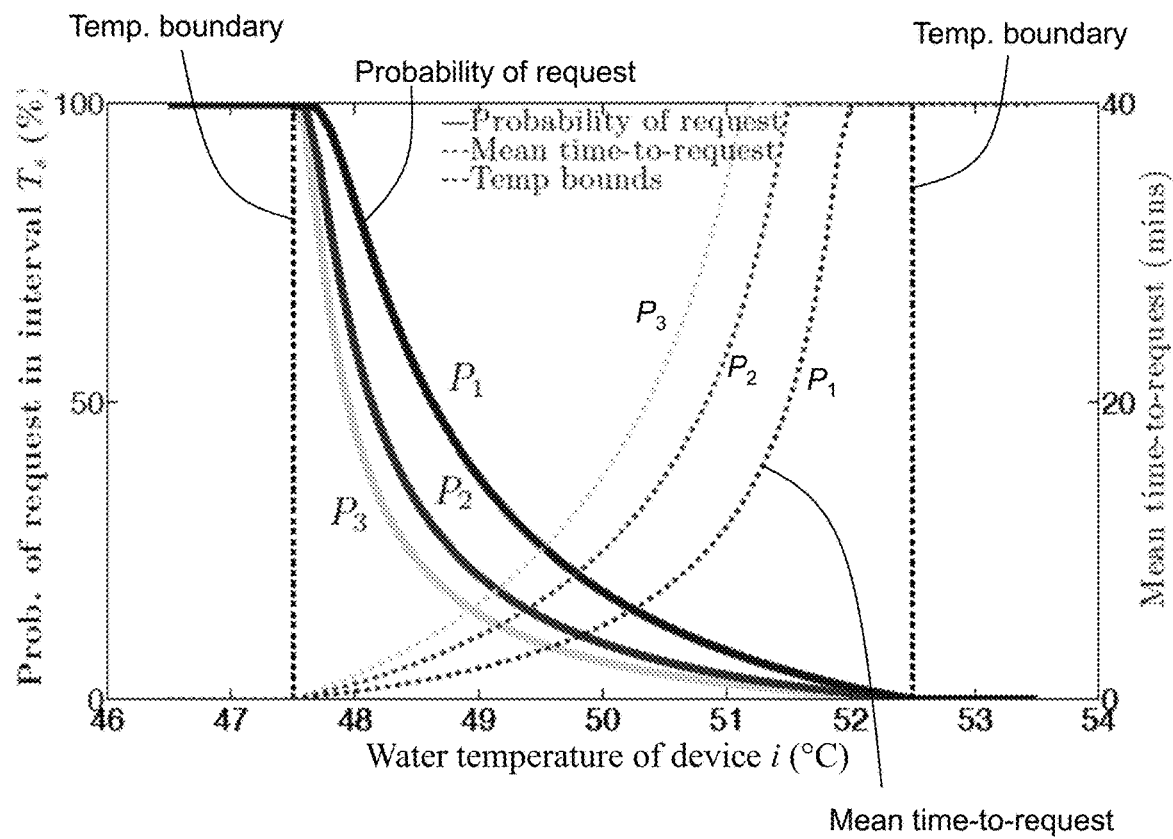
FIG. 4 is a graph illustrating the effect of local temperature on the stochastic access request rates (bold) and mean time-to-request (dashed) of a three-state TCL under PEM. For graphical purposes only, the mean time-to-request have been truncated to 40 minutes.

If the symmetric definitions for $T_n^{min} := T_n^{set} - T_n^{set,DB}$ and $T_n^{max} := T_n^{set} + T_n^{set,DB}$ are considered, then the mean time-to-request for TCL n with $T_n[k] = T_n^{set}$ is exactly described by $1/M_i$ (in seconds), which represents a useful parameter for design of the finite-state machine. FIG. 4 illustrates a TCL's stochastic request rate for a three-state automaton, where $P_1(T_n[k]) > P_2(T_n[k]) > P_3 T_n[k])$ are defined by the bold blue, red, and green lines, respectively. Furthermore, probability $P_i T_n[k])$ is differentiable with respect to $T_n[k]$.

4) Guaranteed Minimum Quality of Service Under PEM

With the stochastic nature of TCLs under PEM, it is entirely possible that a disturbance (e.g., a large hot water withdrawal rate) can drive $T_n[k]$ below $T_n^{min}$. Therefore, to maximize quality of service to the consumer (i.e., avoid cold showers), in some embodiments of the present disclosure, a TCL under PEM can temporarily exit (i.e., opt-out of) PEM and operate under traditional TCL control (e.g., turn ON and stay ON). This is illustrated in FIG. 2 (left) at event $t_c$ and with ON/OFF automaton states in FIG. 2 (right). That is, once a TCL under PEM exceeds temperature bounds, the traditional control logic is employed temporarily to bring the local temperature within PEM "recovery bounds" $T_n^{set} \pm T_n^{set,PEM}$ with $T_n^{set,PEM} < T_n^{set,DB}$ when PEM control logic is reinstated (i.e., TCL opts back into PEM). The recovery bounds are helpful to avoid excessive exit/re-entry cycling at the min/max bounds. While cold showers are undesirable, overheating hot water heaters can be dangerous to consumers and damaging to the water heaters. As such, a TCL under PEM may be configured to never actuate if $T_n[k] > T_n^{max}$.

B. Coordinating TCLs with PEM: Virtual Power Plant (VPP)

Figure 3:
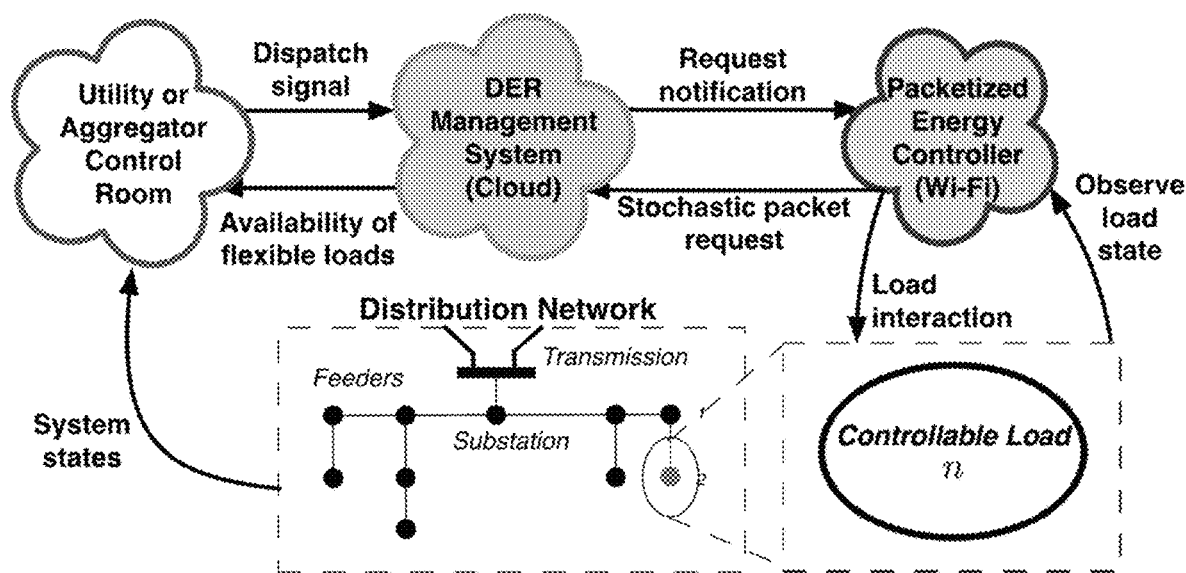
FIG. 3 is a diagram of an exemplary cyber-physical infrastructure to realize PEM.
Figure 5:
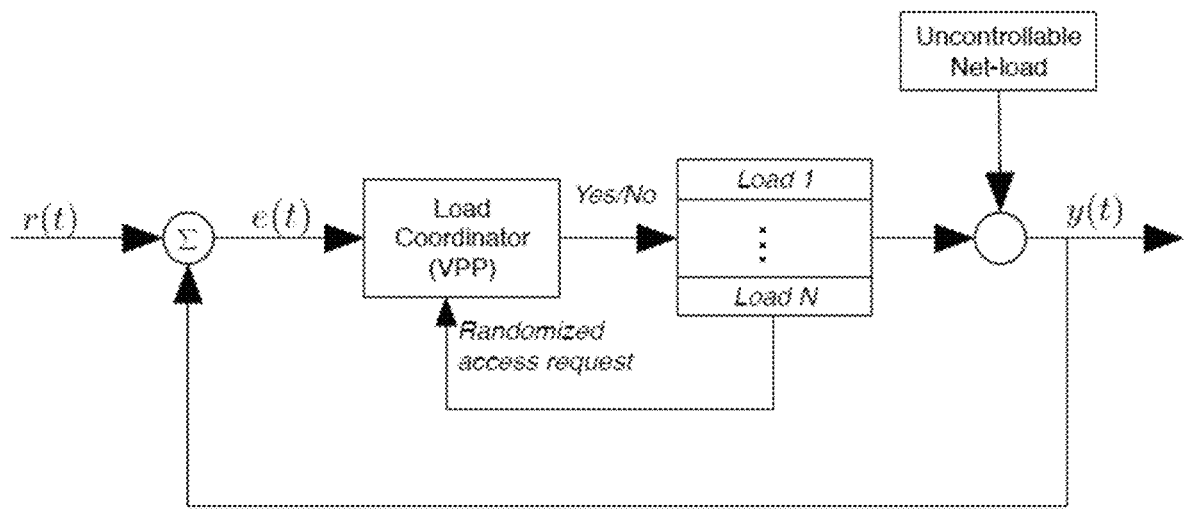
FIG. 5 is a diagram depicting the closed-loop feedback system for PEM with the reference r(t) provided by the Grid Operator and the aggregate packetized TCL output response y(t) measured by VPP. The reference r(t) can be a voltage reading, available supply signal, energy pricing information, etc.

As shown in the exemplary embodiment of FIG. 3, a consumer-owned gateway (e.g., home Wi-Fi) may enable bidirectional communication between packetized loads and a cloud-based DER coordinator: a virtual power plant (VPP). The VPP receives balancing commands from and upstream grid operator and coordinates flexible energy resources to track the balancing command. Within the proposed PEM scheme, the VPP tracks the balancing signal by responding to downstream load access requests (i.e., pings) with "Yes" or "No" notifications based on real-time output error between actual aggregate output, y(t), and the reference signal, r(t): e(t):=r(t)−y(t). This is illustrated in FIG. 5. If e(t)>0 then "Yes"; else "No." Thus, the VPP is summarized by the following inputs and outputs:

Input: Balancing reference signal;
Output: Yes/No access notification; control epoch length.

C. Providing Grid-Level Service with PEM

The transmission (e.g., ISO New England) or distribution utility system operator (e.g., the DSO Control Room in FIG. 3) is able to measure or estimate the states of the grid, such as voltage, frequency, and power flows. Under scenarios with high penetration of renewable energy, the grid operator will find it ever more difficult to balance demand and supply and, therefore, seeks to leverage the flexible packetized DERs sitting in customer homes and industrial/commercial facilities. This is achieved by signaling individual balancing requests to VPPs across the grid in near real-time, akin to Automatic Generator Control (AGC) signals, which are transmitted every 4-5 seconds today. Thus, the grid operator is summarized by the following inputs and outputs:

Input: Grid states and net-load forecasts;

Output: Balancing request signal;

In summary, by managing the anonymous, fair, and asynchronous pings of packetized loads via a VPP that receives grid or market-based balancing signals from the grid operator, PEM represents a bottom-up distributed control scheme that has been adapted for TCLs in this paper.

Control of Bi-Directional Resources

In another aspect of the present disclosure, the bi-directional control of a DESS is enabled using two different probabilistic automatons. Bi-directional resources like DESSs improve the ability of a VPP to ramp down (via discharging). TCLs are not controllable to the same extent as they can only be controlled to go down (i.e., by rejecting):

VPP declines a TCL packet request→doesn't ramp up but cannot control rate of ramping down without having a delay in response.

VPP accepts a TCL packet request→ramps up and can control rate of ramping up by saying "YES" to every request (assuming sufficient requests are incoming) thereby controlling the rate of ramping up with rate of acceptance.

VPP accepts a DESS discharging request→ramps down and can control rate of ramping down with rate of accepting discharging requests VPP accepts a DESS charging requesting→ramps up and can control rate of ramping up with rate of accepting charging requests.

Thus, energy storage improves the VPP's ability to ramp down. As such, PEM actually improves with more heterogeneous loads—thriving under a diversity of loads. In the exemplary embodiment below, electric battery storage is considered, however, the scope of the disclosure is not limited to electric battery storage. Embodiments of the disclosure may use other storage types such as, for example, mechanical storage (e.g., pneumatic and hydraulic pump storage), electrical-chemical storage processes (e.g., electrolysis/fuel cell operation), etc. and combinations of different storage types. Similarly, language used throughout the present disclosure uses the vernacular of a battery storage system (e.g., "State of Charge") for convenience only, and the disclosure should not be limited to embodiments using only battery storage systems.

A first automaton determines the probability that the DESS will request an energy packet from the grid (i.e., a "charge")—similar to the PEM methods disclosed above. A second automaton determines the probability that the DESS will request to provide an energy packet to the grid (i.e., a "discharge"). The probabilities are dictated by the state of charge (SOC) of the DESS. To ensure a minimum SOC is maintained, a charge threshold ($C_{thresh}$), below which the first automaton always request an energy packet, can be set (i.e., probability is set to "1"). Likewise, to allow excess DESS energy to be sell back to the grid, there may be a discharge threshold ($D_{thresh}$), above which the second automaton's probability is set to "1." Between the two thresholds, the DESS can, at each epoch, request a charge, discharge, or standby (i.e., no request). The first and second automatons operate independently, so if both a charge request and a discharge request are desired in the same epoch, the DESS will standby (i.e., neither request will be sent).

In some embodiments, the node 10 is a DESS (e.g., manages a DESS), and the node condition (T) may be a state of charge of the DESS. The request probability is a charge request probability (i.e., the probability that the node will request a charge in the communication epoch. The node 10 may be further configured to determine a discharge request probability for the epoch. The discharge request probability may approach 1 as the node condition (state of charge) increases to a discharge threshold ($D_{thresh}$). The charge request probability may approach 1 as the node condition decreases to a charge threshold ($C_{thresh}$). The charge threshold is less than the discharge threshold ($C_{thresh}<D_{thresh}$). The node 10 may be further configured to create a charge request based on the charge request probability and the state of charge condition (node condition). The node 10 may be further configured to create a discharge request based on the discharge request probability and the state of charge condition. In some embodiments, when the charge request probability and the discharge request probability are such that both a charge request and a discharge request would be sent, the node may be configured to send neither a charge request not a discharge request. In other words, the node is configure such that neither a charge request nor a discharge request are created if the charge request probability and the discharge request probability would otherwise cause both to be created.

In some embodiments the node 10 is a DESS (e.g., manages a DESS), and the node condition is a state of charge of the DESS. The node may be configured to determine a charge request probability for the epoch, wherein the charge request probability approaches 1 as the state of charge decreases to the charge threshold, $C_{thresh}$, and a discharge request probability approaches 1 as the state of charge increases to a discharge threshold, $D_{thresh}$, where $C_{thresh}<D_{thresh}$. The node may be further configured to create a charge request with a determined probability (the charge request probability) based on the state of charge condition and create a discharge request with a different determined probability (the discharge request probability) based on the state of charge condition. If the charge and discharge automatons either both create a request or both do not create a request then no request is forwarded to the coordinator. If only one of the automatons creates a request then that request (charge or discharge) is forwarded to the coordinator.

Figure 8:
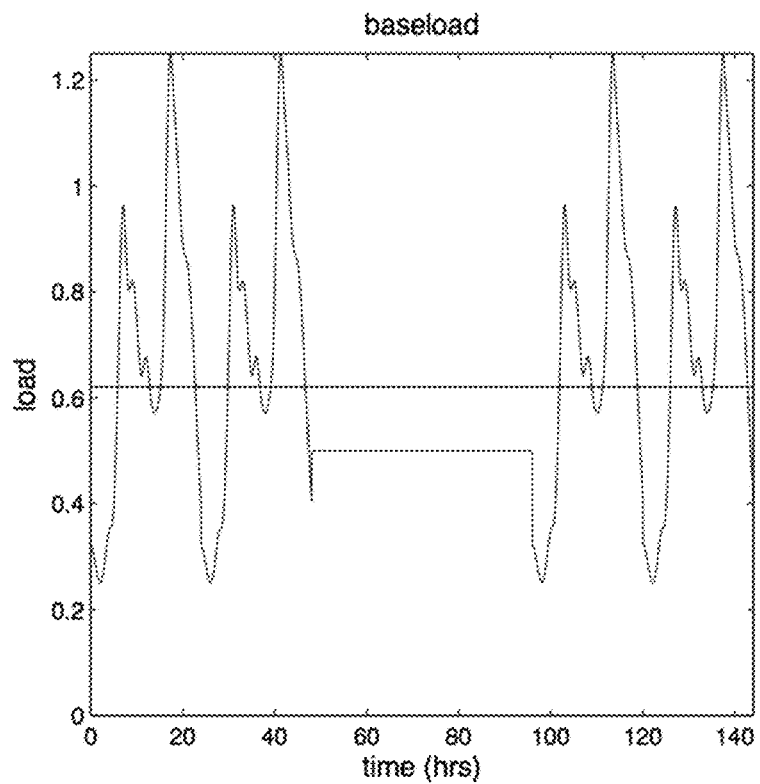
FIG. 8 shows an external variable load in a simulation.

To illustrate the bi-directional embodiment, a simulation was conducted for 1000 DESSs over a simulated timeframe of six days. Over the course of six days, the system sees the 'external' variable load illustrated in FIG. 8. Note that the load extends beyond 1.0 at its peaks indicating that energy from the DESSs will be needed to meet the load. The load profile for days 1, 2, 5, and 6 are based on residential data. The load profile for days 3 and 4 are set artificially low to illustrate how excess supply can be used to bring the DESSs up to full SOC. The base external supply is assumed to be constant at 60% of a 1.0 load (see FIG. 9).

Figure 10:
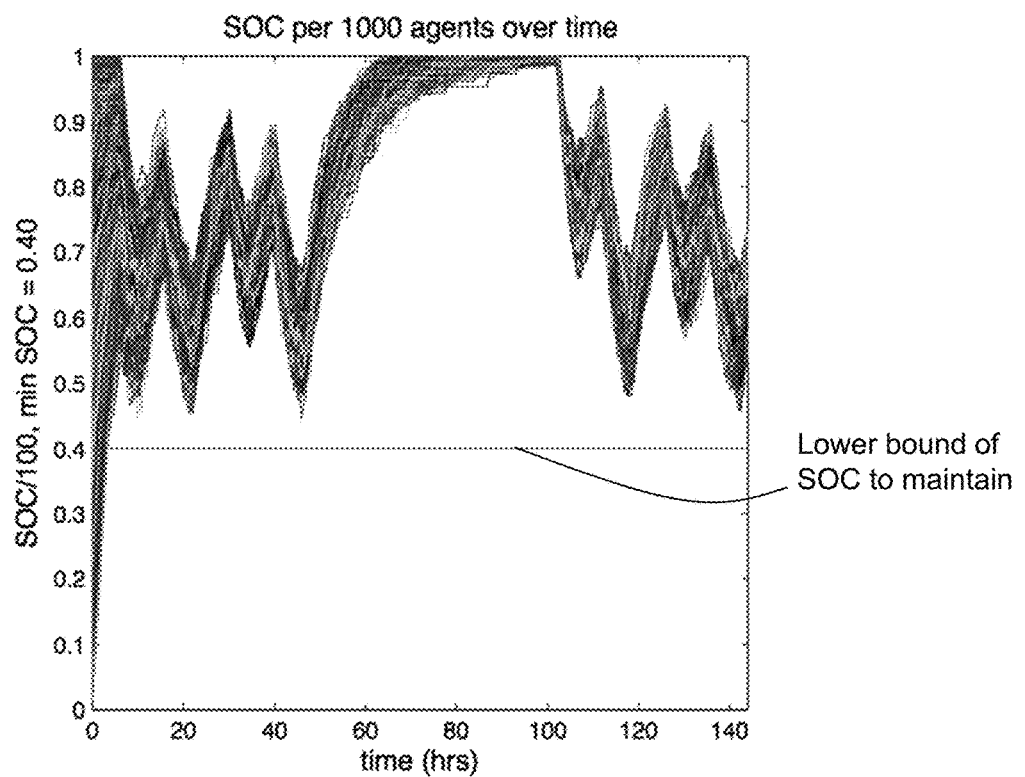
FIG. 10 shows the state of charge (SOC) per 1000 agents over time for the simulation of FIG. 8.

1000 DESS agents were utilized with control automatons configured to ensure at least 0.4 SOC was maintained (see FIG. 10). This was an end-user defined parameter related to their desired quality of service. Note that this threshold could be arbitrarily set and does not need to be the same across all agents. SOC for the 1000 DESSs were randomly assigned (0 to 1) at the beginning of the simulation.

Figure 12:
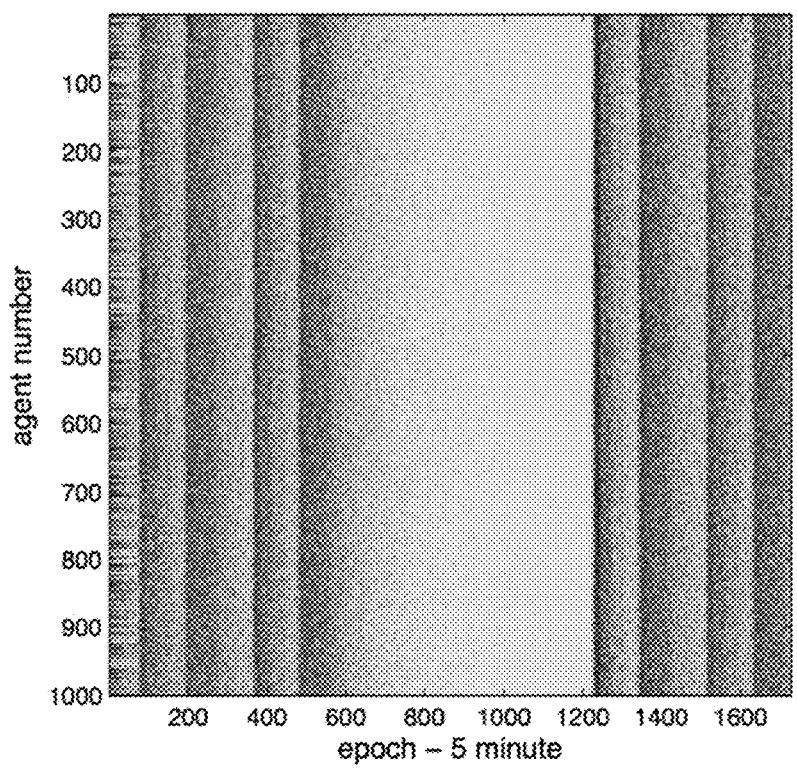
FIG. 12 shows transactions at each epoch for the simulation of FIG. 8.
Figure 13:
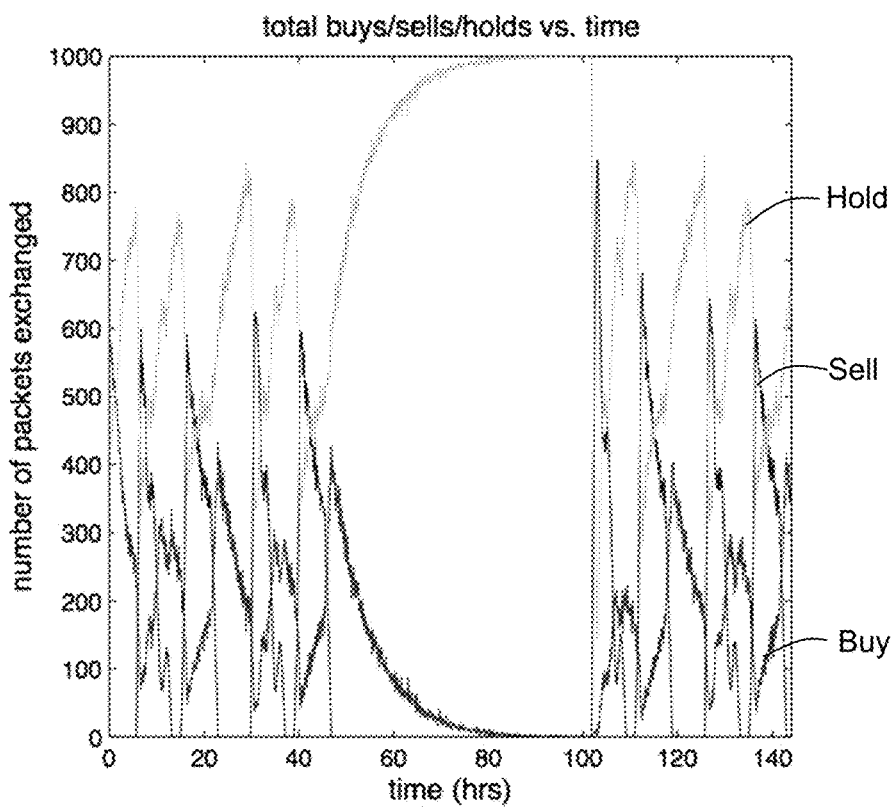
FIG. 13 total buys, sells, and holds over time for the simulation of FIG. 8.

At each epoch, a DESS agent charged (dark gray), discharged (medium gray), or held (light gray) as seen in FIG. 12. The total buys/sells/holds are shown in FIG. 13 and their sum equals the number of agents (1000).

Figure 9:
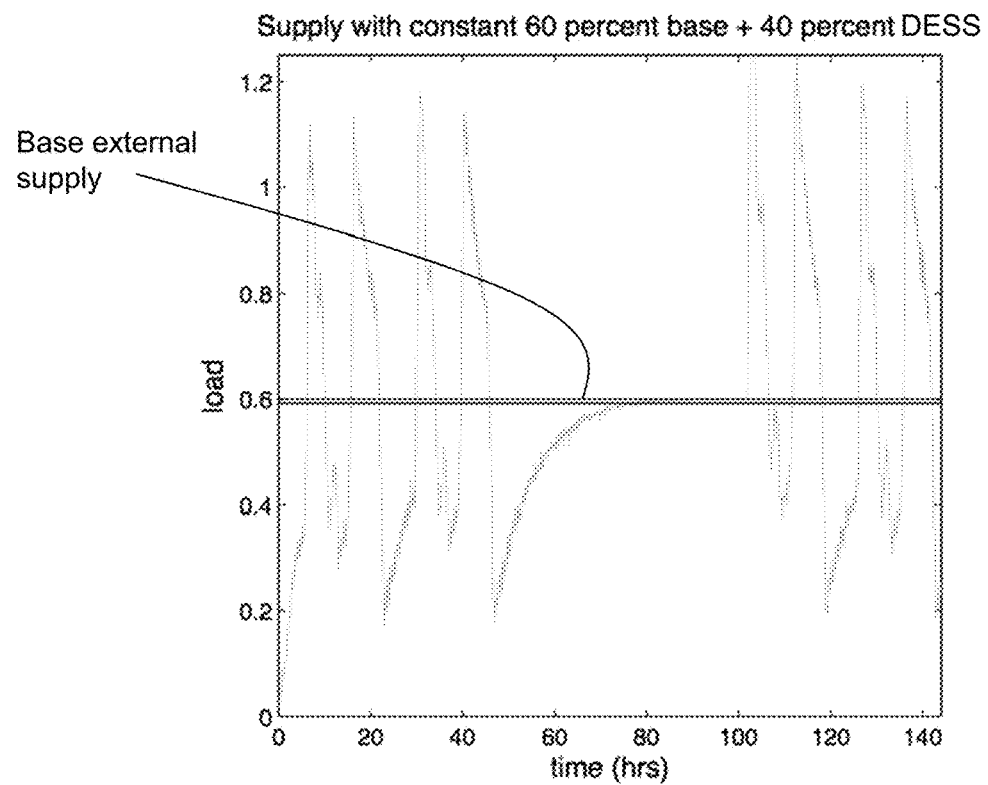
FIG. 9 shows the supply with constant 60 percent base+40 percent DESS for the simulation of FIG. 8.

The varying line in FIG. 9 shows the net supply to the system at each epoch from the DESSs. This does not match the external load exactly for there is additional load in charging DESSs (i.e., agents) with low SOC.

Figure 11:
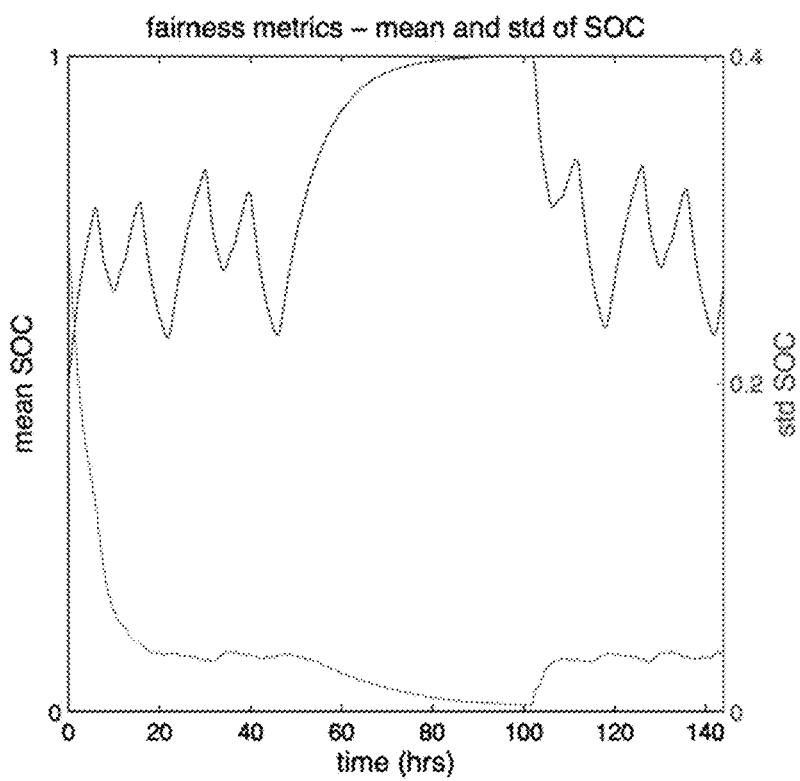
FIG. 11 shows fairness metrics (mean and standard deviation of SOC) for the simulation of FIG. 8.

More dynamics in the load (FIG. 8) leads to more dynamics and disparity in the DESS agent's SOC (FIGS. 10 and 11).

Figure 6:
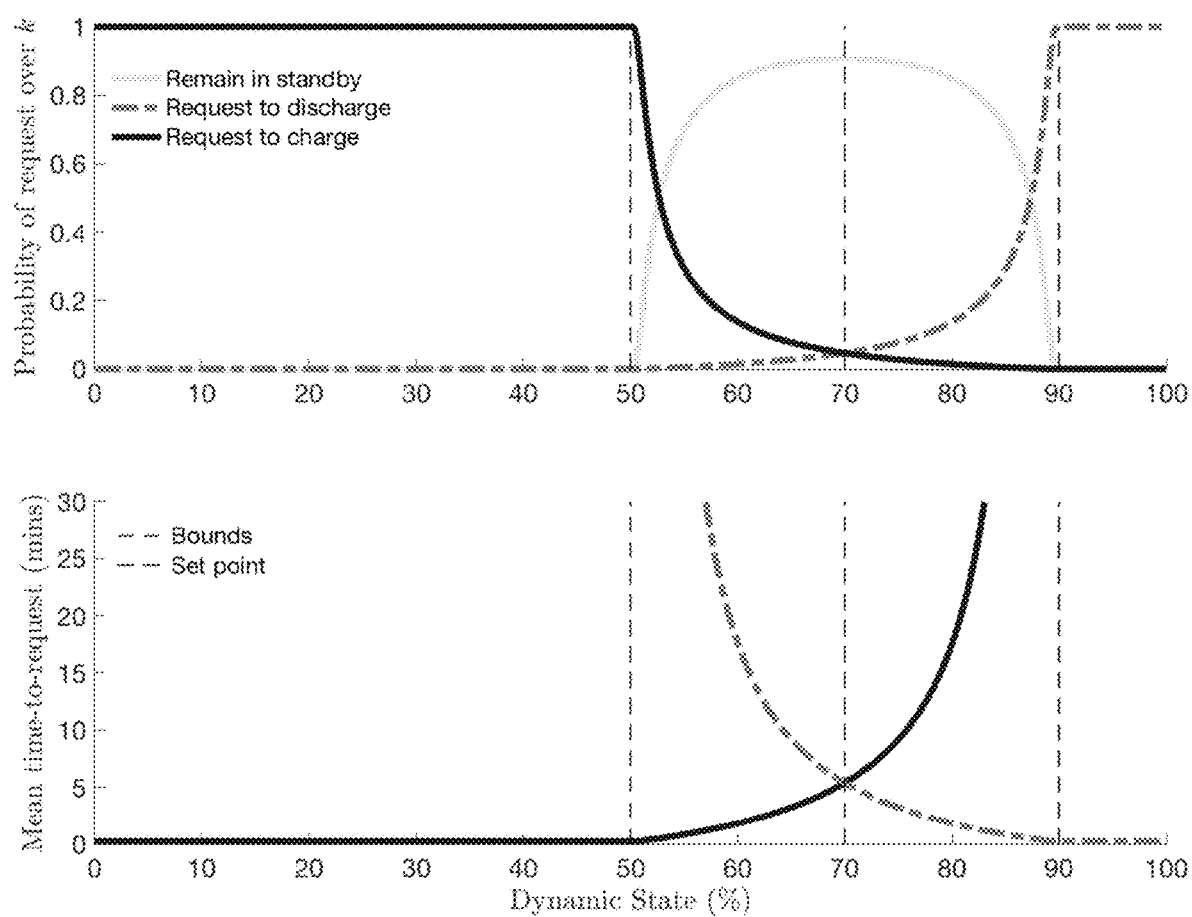
FIG. 6 top shows the request probability curves for "charge" and "discharge" automatons as a function of a DESS's dynamic state (e.g., state of charge in a battery storage system). Under an embodiment of the present invention, an "idle" or "stand-by" state probability curve naturally results when both charge and discharge automatons either do create a request or do not create a request. A request is forwarded to the VPP coordinator only if one of the automatons results in a request.
Figure 7:
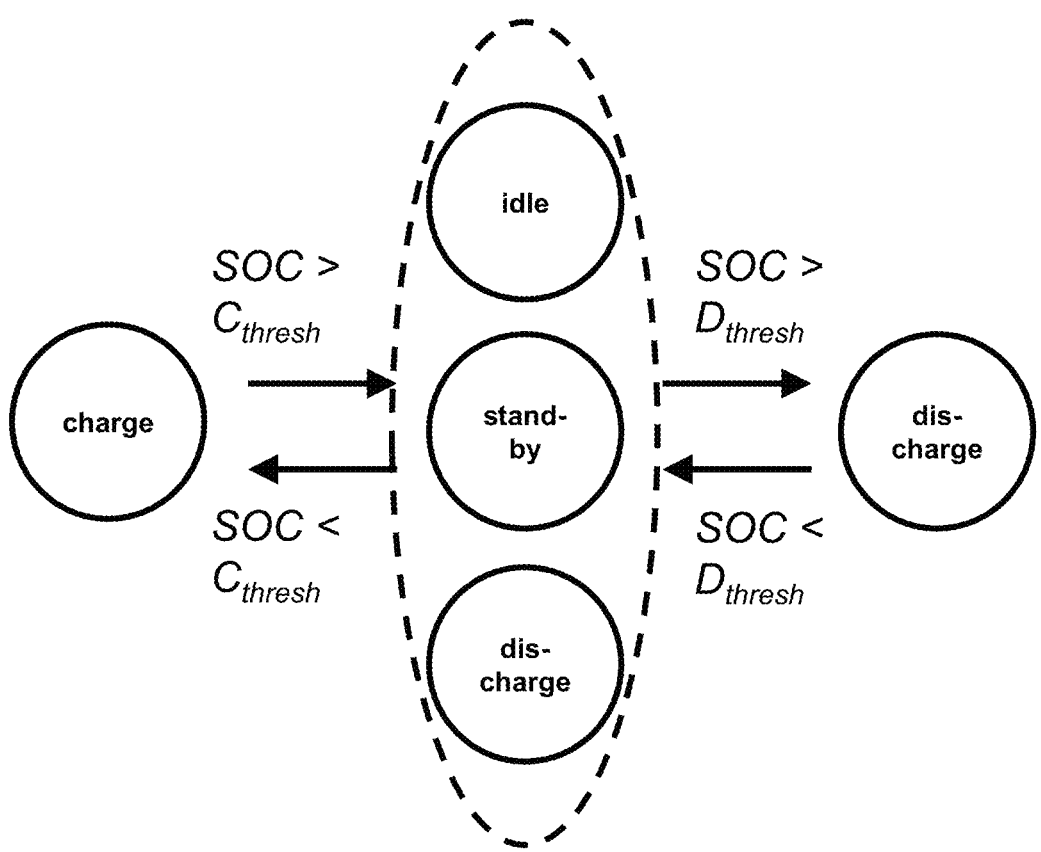
FIG. 7 is a state flow diagram that is dependent on charge and discharge thresholds ($C_{thresh}$ and $D_{thresh}$, respectively).

Operation of the automaton is illustrated in FIGS. 6 and 7. If the agent's SOC was below the minimum ($C_{thresh}$; in this example 0.4), the agent will request charge with probability 1 and will not request a discharge. If the agent's SOC is above the 0.4 minimum, it will request a charge with probability 1—SOC and (independently) a discharge with probability SOC. If both actions are 'true' then the agent will "hold" (i.e., standby—issue neither request). In this example, the discharge threshold was set to SOC=1.0, effectively disabling that feature.

Exemplary Case Study: VPP Operating with Both Homogeneous and Heterogeneous Loads.

This example demonstrates how a single VPP, under PEM, can operate a diverse fleet of heterogeneous DERs. Specifically, the following case-study illustrates how 1500 heterogeneous packetized TCL (1000), PEV (250), and ESS (250) devices can all be coordinated under with single VPP and simultaneously track a reference signal (in the aggregate) and satisfy (local) QoS constraints.

The uncontrollable background demand for each load type describes the random perturbations to the local dynamic state.

TCL: for the 1000 residential electric water heaters, the uncontrollable demand represents the use of hot-water in the home, such as a shower and running the washing machine or dishwasher. For this numerical example, models were developed based on statistics found in the literature for the energy use patterns of electric water heaters.

PEV: the background demand in the case of the 250 plug-in electric vehicle batteries represent the driving patterns that discharge the battery. The PEV travel patterns were randomly sampled from travel survey data for New England, which provides the stochastic model for residential arrival and departure times, as well as miles driven. From an assumed electric driving range of 150 miles and an electric driving efficiency of 6.7 miles-per-kWh, the total reduction in SOC is computed upon arriving home (to charge).

ESS: the 250 home batteries were based on specifications representative of a large battery manufacturers residential energy storage units typical of a large battery manufacturer, which each have a battery capacity of 13.5 kWh, charge and discharge efficiency of around 95% (roundtrip of 92%), and a maximum (continuous) power rating of 5.0 kW. It was assumed that the battery owner stochastically charges or discharges the battery based on a Gaussian random walk with a minimum power draw of 1.5 kW in either direction. This could be representative of excess or deficit residential solar PV production or short-term islanding conditions.

Figure 14:
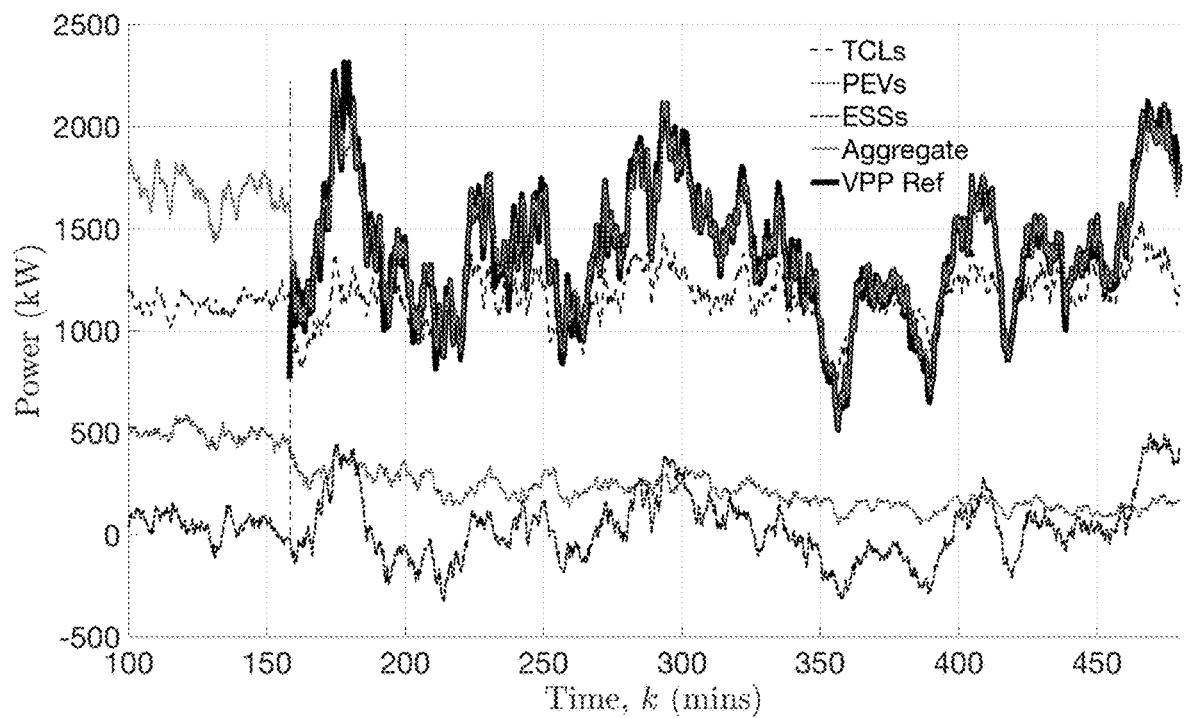
FIG. 14 is graph showing the independent and managed behavior of a VPP over 8 hours (480 minutes) that consists of three different load types: 1000 electric water heaters, 250 electric vehicle chargers, and 250 electric battery storage systems. The signal to be tracked by the VPP turns on at 160 minutes. VPP response is shown to track signal well as loads are being managed using the packetized energy management approach.

The N=1500 diverse DER devices are then packetized and, over an 8-hour period (16:00 to 24:00), the VPP will interact with the loads and from 18:40 to 24:00 the VPP tracks a mean-reverting random signal that represents a balancing signal from the ISO. The tracking is achieved by denying or accepting packet requests based on real-time error between reference and aggregated VPP power output as described earlier. The tracking errors are less than 5% for packet epochs of δ=5 minutes. FIG. 14 illustrates the tracking performance of the VPP and that QOS requirements are satisfied as well.

Figure 15:
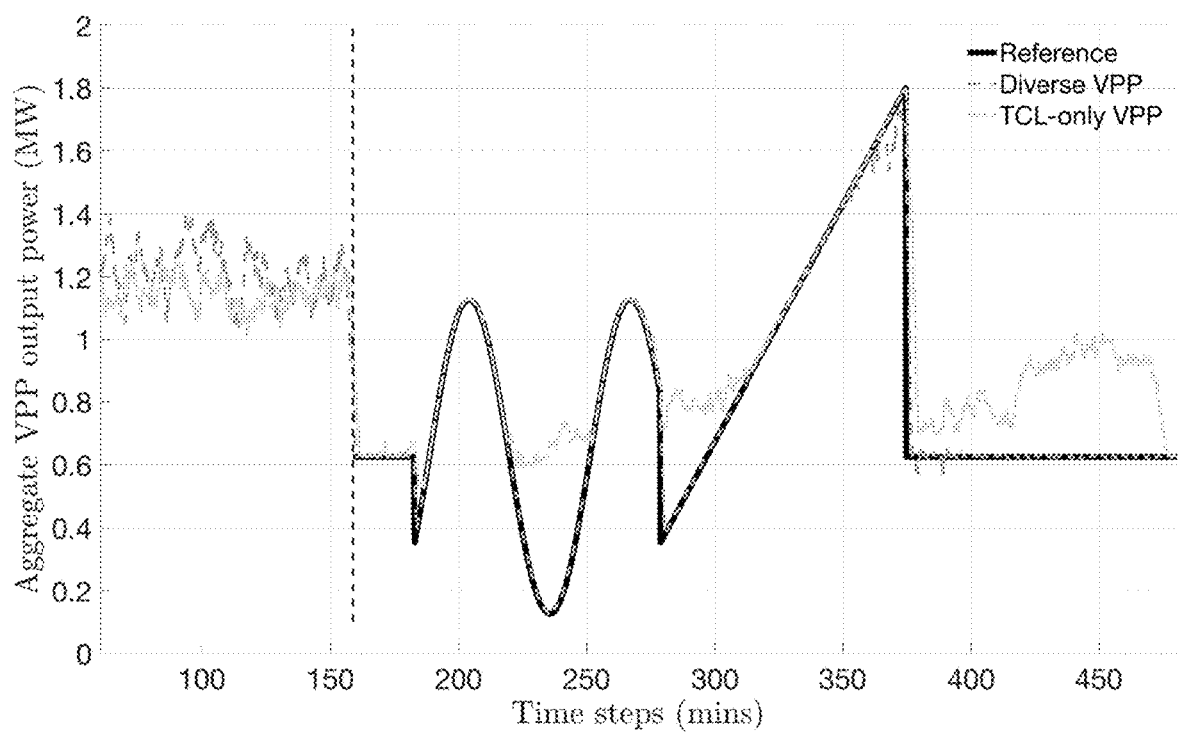
FIG. 15 shows two VPPs that are tracking a multi-mode reference signal with different sets of DERs. The diverse VPP (with 1000 TCLs, 250 PEVs, and 250 ESS batteries) significantly outperforms the 1000 TCL-only VPP by leveraging the bidirectional capability of the batteries while maintaining QOS across all DER types. The TCL-only VPP is unable to track due to large number of TCLs that enter exit-ON and opt out of PEM.
Figure 16A:
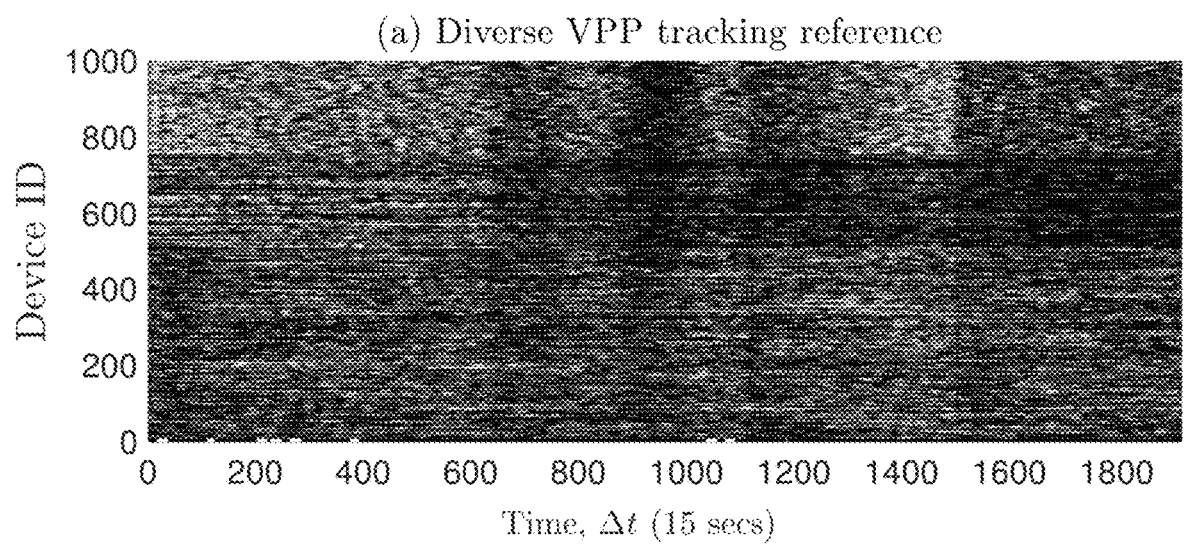
FIG. 16A shows the packetization effect for the diverse network of FIG. 15.
Figure 16B:
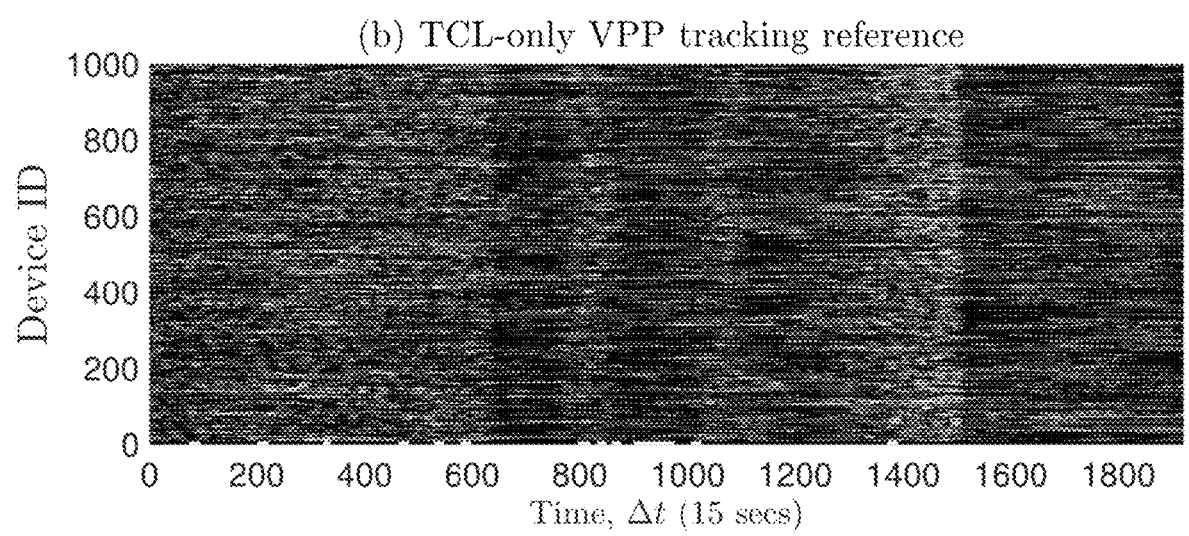
FIG. 16B shows the packetization effect for the uniform network 1500 electric water heaters of FIG. 15.
Figure 17:
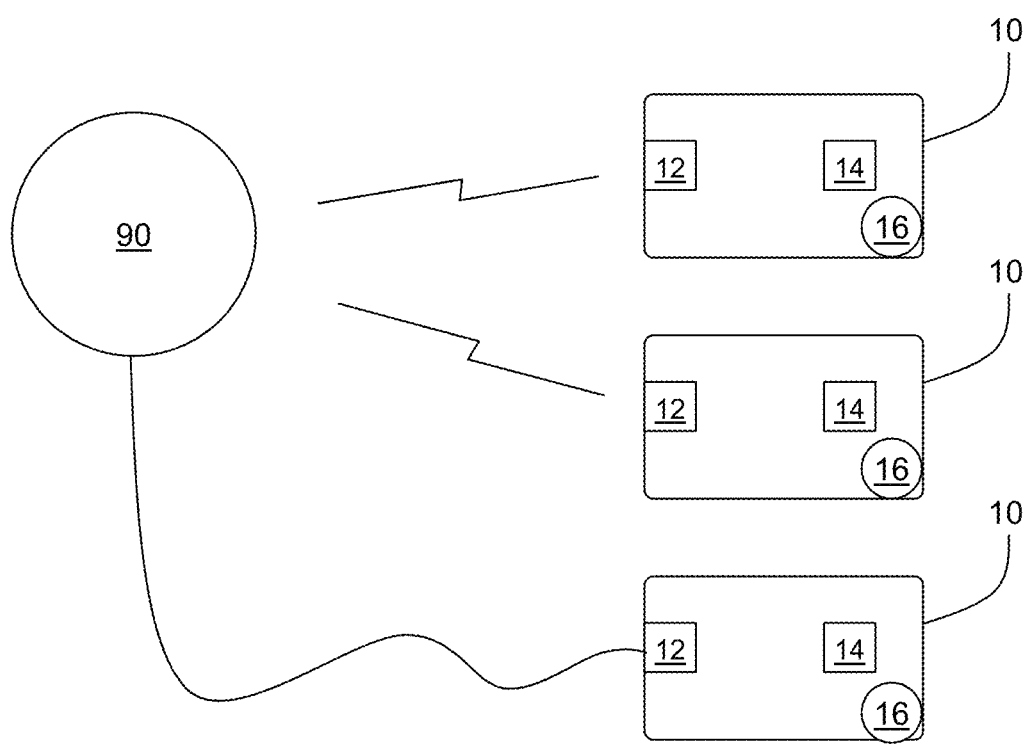
FIG. 17 is a diagram of a system according to another embodiment of the present disclosure, and includes three nodes according to the disclosure.
Figure 18:
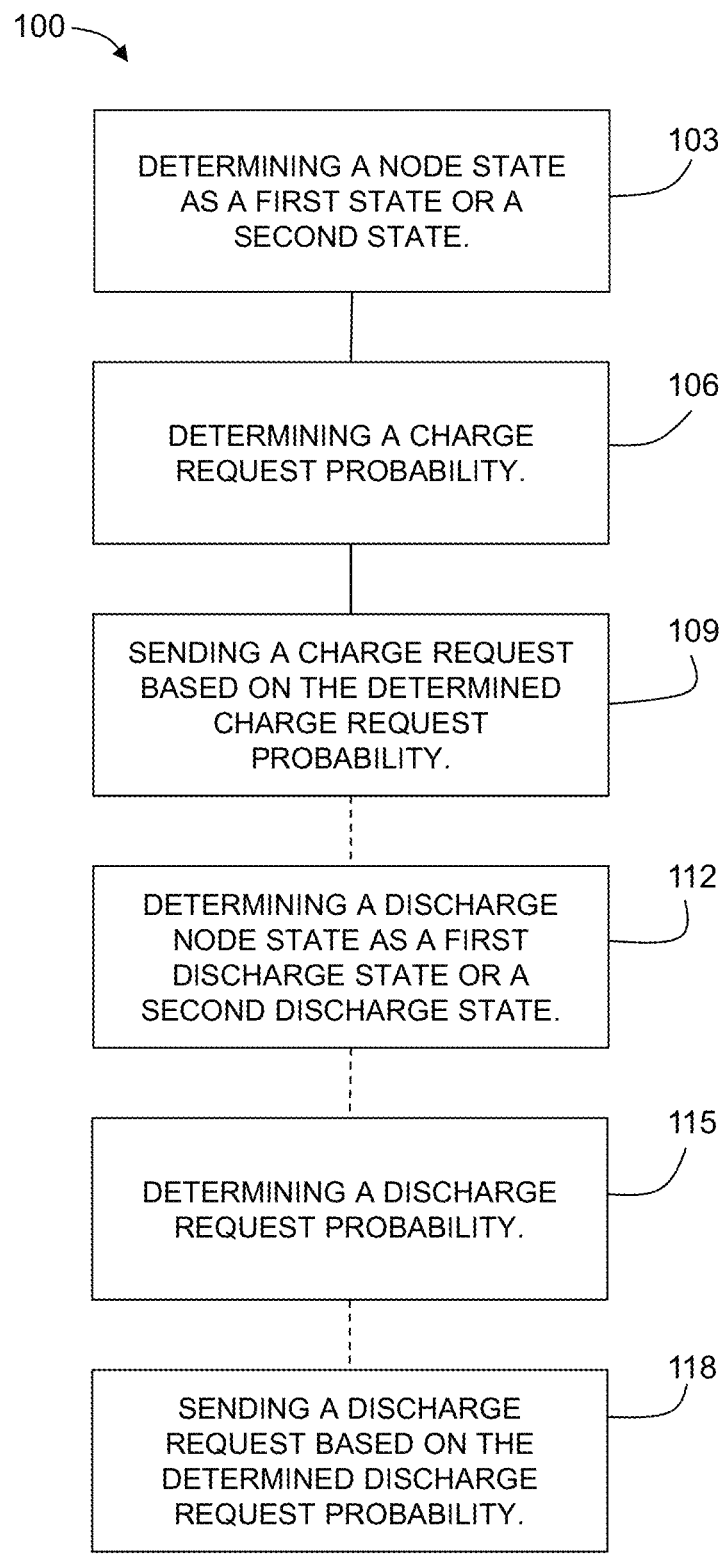
FIG. 18 is a chart according to another embodiment of the present disclosure.

Consider two VPPs: one is comprised of 1000 TCLs, 250 PEVs, and 250 ESS batteries (i.e., diverse VPP) while the other contains 1500 TCLs (i.e., TCL-only VPP). FIG. 15 illustrates how these two VPPs perform in tracking a signal composed of step, periodic, and ramp changes. It is clear that the diverse VPP out-performs the TCL-only VPP. In fact, the root mean square tracking error for the diverse VPP is four times smaller than the TCL-only VPP (54 kW vs. 220 kW). Moreover, observe that this gain in performance comes without sacrificing QoS as the TCLs in both VPPs experience nearly identical mean absolute deviation from the temperature set-point: 2.4° C. vs. 2.5° C. (with similar standard deviations). To further illustrate the value of a diverse fleet of resources, FIGS. 16A and 16B provide the ON/OFF statuses for each device in the respective VPPs. Careful comparison of the VPP illustrate that the TCL-only VPP fails to track the lower parts of the reference signal due to many TCLs opting out (i.e., transitions to exit-ON) as signified by very long continuous ON periods for the TCL-only VPP in FIGS. 16A and 16B. That is, diversity in distributed energy resources not only improves tracking ability, but also improves QoS delivered to end-consumer.

Although the present disclosure has been described with respect to one or more particular embodiments, it will be understood that other embodiments of the present disclosure may be made without departing from the spirit and scope of the present disclosure. Hence, the present disclosure is deemed limited only by the appended claims and the reasonable interpretation thereof.

We claim:

1. A node for requesting electrical power from a coordinator during a communication epoch, the node comprising:
   a coordinator interface for communication with the coordinator;
   a plurality of probability states that define corresponding request probabilities, wherein at least one of the probability states defines a request probability that varies as a function of a dynamic node condition to thereby adjust the node's request probability according to the node's need for electrical energy while the node is in the same probability state; and
   a state register for recording the one of the plurality of probability states the node is currently in;
   wherein the node is configured to:
      retrieve the current probability state from the state register;
      receive a value for the node condition;
      determine a request probability for the epoch probability state according to the retrieved probability state and the received value of the node condition; and
      request an energy packet from the coordinator according to the determined request probability.

2. The node of claim 1, wherein the node condition, is one or more of a temperature, a pressure, a revolution rate, a state of charge, and a time-based deadline.

3. The node of claim 1, wherein the request probability defined by the at least one probability state approaches 1 as the node condition reaches a lower threshold and the request probability approaches 0 when the node condition approaches an upper threshold.

4. The node of claim 3, wherein the node is configured to opt-out of requesting energy packets when the node condition reaches the lower threshold.

5. The node of claim 1, wherein the request probability defined by the at least one probability state approaches 1 as the node condition reaches an upper threshold, and the request probability approaches 0 when the node condition approaches a lower threshold.

6. The node of claim 5, wherein the node is configured to opt-out of requesting energy packets when the node condition, reaches the upper threshold.

7. The node of claim 1, wherein the plurality of probability states includes a first probability state that defines a first request probability, P1(n), that varies as a function of the dynamic node condition, n, and a second probability state that defines a second request probability, P2(n), that varies as a function of the dynamic node condition, wherein for a given value of the dynamic node condition, n, P1 is greater than P2.

8. The node of claim 7, wherein the plurality of probability states includes three or more probability states.

9. The node of claim 1, wherein the node is further configured to:
receive a response to the request; and
change the probability state recorded in the state register based upon the received response.

10. The node of claim 9, wherein the node is configured to determine whether to access electrical power according to the received response.

11. The node of claim 1, wherein the node is configured to receive a communication epoch parameter from the coordinator to determine a length of time between the requests.

12. The node of claim 1, wherein the node is a distributed energy storage system (DESS), the node condition is a state of charge of the DESS, and the request probability is a charge request probability, and wherein the node is further configured to:
determine a discharge request probability for an epoch, wherein the determined discharge request probability corresponds to the retrieved probability state and a present value of the state of charge, wherein the charge request probability varies as a function of the state of charge and approaches 1 as the state of charge decreases to a charge threshold, Cthresh, and the discharge request probability varies as a function of the state of charge and approaches 1 as the state of charge increases to a discharge threshold, Dthresh, where Cthresh<Dthresh; and
create a charge request based on the determined charge request probability, and create a discharge request based on the determined discharge request probability.

13. The node of claim 1, wherein the node is a physical device configured to be co-located with a distributed energy resource.

14. The node of claim 1, wherein the node is a software agent configured to remotely manage a distributed energy resource.

15. The node of claim 1, wherein the coordinator interface is in wireless communication with the coordinator.

16. The node of claim 1, wherein the coordinator interface is in wired communication with the coordinator.

17. The node of claim 16, wherein the coordinator interface communicates with the coordinator using power-line communications (PLC).

18. A system for providing electrical power, comprising:
a coordinator in communication with an electrical power source; and
one or more nodes in communication with the coordinator, each node configured to receive electrical power from the electrical power source in a plurality of discrete energy packets each having a finite duration, each of the one or more nodes configured to request an energy packet during a time interval based on individually determined request probabilities, wherein the nodes have a plurality of probability states, each of the states having a corresponding request probability, and wherein the request probability for at least one of the probability states varies as a function of a node condition so that the request probability changes according to the node's need for electrical energy while the node is in the same probability state, wherein each of the one or more nodes is configured to receive a present value of the probability state and a value of the node condition and determine a request probability for a time interval according to the received probability state and value of the node condition;
wherein the coordinator is configured to:
receive the requests from the one or more nodes; and
determine whether to grant or deny each request based on the availability of the electrical power.

19. The system of claim 18, wherein the coordinator further determines whether to grant or deny each request based on one or more market conditions.

20. The system of claim 18, wherein at least one node of the one or more nodes is thermostatic in nature, and wherein the node condition of the at least one node is a temperature, T, and the request probability for the at least one probability state approaches 1 as T reaches a lower threshold, Tlow, and the request probability approaches 0 when T approaches an upper threshold, Thigh.

21. The system of claim 18, wherein at least one node of the one or more nodes is thermostatic in nature, and wherein the node condition of the at least one node is a temperature, T, and the request probability for the at least one probability state approaches 1 as T reaches an upper threshold, Thigh, and the request probability approaches 0 when T approaches a lower threshold, Tlow.

22. The system of claim 18, wherein the plurality of probability states includes a first state and a second state, the first state having a first request probability, P1(n), that varies as a function of the node condition, n, and the second state having a second state request probability, P2(n), that varies as a function of the node condition, wherein for a given value of the node condition, P1>P2.

23. The system of claim 22, wherein when the at least one node is in the second state, it is configured to change from the second state to the first state based upon a granted request.

24. The system of claim 22, wherein when the at least one node is in the first state, it is configured to remain in the first state based on a granted request.

25. The system of claim 22, wherein when the at least one node is in the second state, it is configured to remain in the second state based on a denied request.

26. The system of claim 22, wherein when the at least one node is in the first state, it is configured to change from the first state to the second state based on a denied request.

27. The system of claim 22, wherein the plurality of probability states further comprises a third state, the third state having a third request probability, P3(n), that varies as a function of the node condition, wherein for a given node condition, a value of P3 is lower than a value of the second request probability, P2.

28. The system of claim 27, wherein the plurality of probability states includes more than three states, each of the states having a corresponding request probability that varies as a function of the node condition.

29. The system of claim 18, wherein at least one node of the one or more nodes is a distributed energy storage system (DESS) and the node condition for the DESS is a state of charge of the DESS, and the request probability is a charge request probability, and wherein the DESS is further configured to:
  determine a discharge request probability for a time interval, wherein the determined discharge request probability corresponds to a present value of the state of charge, wherein the charge request probability approaches 1 as the state of charge decreases to a charge threshold, Cthresh, and the discharge request probability varies as a function of the state of charge and approaches 1 as the state of charge increases to a discharge threshold, Dthresh; and
  create a charge request based on the determined charge request probability, and create a discharge request based on the determined discharge request probability.

30. The system of claim 18, wherein the coordinator is configured to receive an availability signal from a grid operator which indicates the availability of the electrical power.

31. The system of claim 18, wherein the coordinator is configured to receive an availability signal from a grid operator which indicates one or more market conditions.

32. The system of claim 18, wherein the coordinator is configured to determine a predicted availability of electrical power by modeling a state of the electrical grid.

33. A method for requesting electrical power during a communication epoch, the method comprising:
  determining a probability state as a first state, with a first request probability, or a second state, with a second request probability, wherein at least one of the first and second request probabilities varies as a function of a node condition that indicates a need for electrical energy to thereby adjust the node's request probability according to the node's need for electrical energy while the node is in the same probability state;
  determining a request probability for the epoch, wherein the determined request probability corresponds to the determined probability state and a present value of the node condition; and
  sending a request based on the determined request probability.

34. The method of claim 33, wherein the node condition is one or more of a temperature, a pressure, a revolution rate, a state of charge, and a time-based deadline.

35. The method of claim 33, wherein the request probability is a charge request probability and the node condition is a state of charge, further comprising:
  determining a discharge probability state as a first discharge state, with a first discharge request probability, or a second discharge state, with a second discharge request probability, wherein at least one of the first and second discharge request probabilities varies as a function of the state of charge; and
  determining a discharge request probability for the epoch, wherein the discharge request probability corresponds to the determined discharge probability state and a present value of the node condition; and
  sending a discharge request based on the determined discharge request probability.

36. The method of claim 35, wherein the charge request probability approaches 1 as the state of charge decreases to a charge threshold, Cthresh, and the discharge request probability approaches 1 as the state of charge increases to a discharge threshold, Dthresh, wherein for a given value of the state of charge, Cthresh<Dthresh.

37. The method of claim 36, wherein no charge request or discharge request is sent in a given epoch in response to determining to request to receive and to discharge electrical power in the same epoch.

38. The node of claim 1:
  wherein the at least one probability state that defines the request probability as a function of a dynamic node condition defines the request probability according to a probability function; and
  wherein the step of determining a request probability for the epoch includes (1) calculating the determined request probability according to the probability function and the received value of the node condition or (2) performing a table lookup for the determined request probability according to received value of the node condition.

39. The node of claim 1:
  wherein the at least one probability state that defines the request probability as a function of a dynamic node condition defines the request probability according to a probability function, wherein the probability function is an exponential distribution function or a linear function; and
  wherein the step of determining a request probability for the epoch includes calculating the determined request probability according to the probability function and the received value of the node condition.

* * * * *

UNITED STATES PATENT AND TRADEMARK OFFICE
CERTIFICATE OF CORRECTION

PATENT NO. : 11,210,747 B2
APPLICATION NO. : 15/712089
DATED : December 28, 2021
INVENTOR(S) : Jeff Frolik et al.

It is certified that error appears in the above-identified patent and that said Letters Patent is hereby corrected as shown below:

In the Claims

In Column 12, Claim 1, Lines 47 and 48, delete the wording "probability state".

Signed and Sealed this
Fourteenth Day of June, 2022

Katherine Kelly Vidal
*Director of the United States Patent and Trademark Office*